(12) United States Patent
Kuzuhara et al.

(10) Patent No.: US 11,428,928 B2
(45) Date of Patent: Aug. 30, 2022

(54) HEAD-UP DISPLAY AND MOBILE BODY EQUIPPED WITH HEAD-UP DISPLAY

(71) Applicant: Panasonic Intellectual Property Management Co., Ltd., Osaka (JP)

(72) Inventors: Satoshi Kuzuhara, Osaka (JP); Hiroaki Okayama, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 160 days.

(21) Appl. No.: 16/998,378

(22) Filed: Aug. 20, 2020

(65) Prior Publication Data

US 2020/0379252 A1 Dec. 3, 2020

Related U.S. Application Data

(63) Continuation of application No. PCT/JP2018/033200, filed on Sep. 7, 2018.

(30) Foreign Application Priority Data

Feb. 23, 2018 (JP) .............................. JP2018-030523

(51) Int. Cl.
*G02B 27/00* (2006.01)
*B60K 35/00* (2006.01)
*G02B 27/01* (2006.01)

(52) U.S. Cl.
CPC .......... *G02B 27/0025* (2013.01); *B60K 35/00* (2013.01); *G02B 27/0101* (2013.01);
(Continued)

(58) Field of Classification Search
CPC ... B60K 35/00; B60K 2370/334; G02B 27/01
See application file for complete search history.

(56) References Cited

U.S. PATENT DOCUMENTS 3,940,204 A 2/1976 Withrington
4,447,128 A 5/1984 Ferrer
(Continued)

FOREIGN PATENT DOCUMENTS

JP 59-502122 12/1984
JP 7-290993 11/1995
(Continued)

OTHER PUBLICATIONS

International Search Report dated Nov. 20, 2018 in International (PCT) Application No. PCT/JP2018/033200.
(Continued)

*Primary Examiner* — Grace Q Li
(74) *Attorney, Agent, or Firm* — Wenderoth, Lind & Ponack, L.L.P.

(57) ABSTRACT

A head-up display of the present disclosure projects a display image on a transparent reflecting member. The head-up display includes: a display device that displays the display image; and a projection optical system that projects the display image displayed on the display device. On an assumption that light reaching a center of a viewpoint region of the observer and corresponding to a center of the virtual image is reference light, the projection optical system includes a prism element that has an incident surface, a reflection surface, and an emitting surface different from the incident surface sequentially in an optical path from the display device. The emitting surface is inclined to the reference light. An inclination amount $\theta_2$ of the reference light emitted from the emitting surface with respect to the emitting surface lies in a range of $15° < |\theta_2| < 45°$ in the optical path from the display device.

16 Claims, 12 Drawing Sheets

(52) U.S. Cl.
CPC .... *B60K 2370/334* (2019.05); *B60K 2370/66* (2019.05); *G02B 2027/011* (2013.01); *G02B 2027/0145* (2013.01)

(56) References Cited

U.S. PATENT DOCUMENTS

| | | |
|---|---|---|
| 2007/0229394 A1 | 10/2007 | Ishikawa et al. |
| 2007/0253080 A1* | 11/2007 | Yokote ............... G02B 27/0994 359/833 |
| 2017/0184843 A1 | 6/2017 | Kuzuhara et al. |
| 2017/0219821 A1 | 8/2017 | Lambert |
| 2018/0039077 A1 | 2/2018 | Kuzuhara et al. |
| 2018/0356631 A1 | 12/2018 | Kuzuhara et al. |

FOREIGN PATENT DOCUMENTS

| | | |
|---|---|---|
| JP | 2003-222819 | 8/2003 |
| JP | 2017-120388 | 7/2017 |
| KR | 20140094455 A * | 7/2014 |
| WO | 2016/208195 | 12/2016 |
| WO | 2017/094248 | 6/2017 |

OTHER PUBLICATIONS

Extended European Search Report dated Mar. 12, 2021 in European Application No. 18907182.2.
English Translation of International Preliminary Report on Patentability dated Sep. 11, 2020 in International (PCT) Application No. PCT/JP2018/033200.

* cited by examiner

Fig.7

| | SURFACE NUMBER | SHAPE | REFRACTION FACTOR | ABBE NUMBER | ECCENTRICITY DATA | | | | | |
|---|---|---|---|---|---|---|---|---|---|---|
| | | | | | X | Y | Z | ADE | BDE | CDE |
| DISPLAY SURFACE | 1 | | | | 0 | 0 | 0 | 0 | 0 | 0 |
| FIRST LENS | 2 | SPHERICAL SHAPE | 1.492 | 57.4 | 0.015886 | 1.847341 | -10.4114 | 9.931014 | -0.46821 | -1.53829 |
| | 3 | FREE-FORM SURFACE | | | -0.06583 | 0.122775 | -20.2613 | 9.931014 | -0.46821 | -1.53829 |
| FIRST MIRROR | 4 | FREE-FORM SURFACE | | | 0.020 | 10.124 | -76.629 | 2.899 | -1.513 | -1.584 |
| PRISM | 5 | FREE-FORM SURFACE | 1.4917 | 57.4 | 3.461 | 27.883 | -14.197 | -18.363 | -1.988 | -2.473 |
| | 6 | FREE-FORM SURFACE | | | 4.719372 | 29.60072 | 11.71605 | -34.2025 | -1.23739 | -2.92171 |
| | 7 | FREE-FORM SURFACE | | | 5.049578 | 51.49116 | 4.666259 | -52.5947 | -0.25149 | -3.16275 |
| SECOND MIRROR | 8 | FREE-FORM SURFACE | | | 8.697 | 203.518 | -15.204 | -62.561 | 0.627 | -0.159 |
| WINDSHIELD | 9 | FREE-FORM SURFACE | | | 9.703 | 3.664 | 204.141 | 83.748 | 3.783 | -9.100 |
| OBSERVER | 10 | | | | 51.825 | -698.477 | 154.721 | 83.748 | 3.783 | -9.100 |

Fig.8

| SURFACE NUMBER | RADIUS OF CURVATURE |
|---|---|
| 2 | ∞ |
| 3 | -36.6 |
| 4 | 184.0 |
| 5 | 1125.0 |
| 6 | -65.5 |
| 7 | -501.2 |
| 8 | -1741.4 |
| 9 | -410.0 |

Fig. 9

| SURFACE NUMBER | | POLYNOMIAL COEFFICIENT | | | | | |
|---|---|---|---|---|---|---|---|
| 3 | C1 | 0.000E+00 | C19 | 8.772E-07 | C37 | 0.000E+00 | C55 | 0.000E+00 |
| | C2 | 0.000E+00 | C20 | 1.571E-06 | C38 | 0.000E+00 | C56 | 0.000E+00 |
| | C3 | -1.000E-01 | C21 | 9.321E-07 | C39 | 0.000E+00 | C57 | 0.000E+00 |
| | C4 | 2.239E-02 | C22 | 1.033E-08 | C40 | 0.000E+00 | C58 | 0.000E+00 |
| | C5 | -2.805E-03 | C23 | 1.846E-10 | C41 | 0.000E+00 | C59 | 0.000E+00 |
| | C6 | 2.304E-02 | C24 | 1.409E-08 | C42 | 0.000E+00 | C60 | 0.000E+00 |
| | C7 | 5.992E-05 | C25 | 1.821E-08 | C43 | 0.000E+00 | C61 | 0.000E+00 |
| | C8 | 8.982E-05 | C26 | -1.654E-07 | C44 | 0.000E+00 | C62 | 0.000E+00 |
| | C9 | -9.220E-05 | C27 | 1.514E-07 | C45 | 0.000E+00 | C63 | 0.000E+00 |
| | C10 | -1.550E-04 | C28 | -1.558E-07 | C46 | 0.000E+00 | C64 | 0.000E+00 |
| | C11 | -4.309E-06 | C29 | 0.000E+00 | C47 | 0.000E+00 | C65 | 0.000E+00 |
| | C12 | 1.337E-07 | C30 | 0.000E+00 | C48 | 0.000E+00 | C66 | 0.000E+00 |
| | C13 | 2.346E-05 | C31 | 0.000E+00 | C49 | 0.000E+00 | | |
| | C14 | -1.545E-05 | C32 | 0.000E+00 | C50 | 0.000E+00 | | |
| | C15 | 3.016E-05 | C33 | 0.000E+00 | C51 | 0.000E+00 | | |
| | C16 | 5.873E-08 | C34 | 0.000E+00 | C52 | 0.000E+00 | | |
| | C17 | -2.358E-07 | C35 | 0.000E+00 | C53 | 0.000E+00 | | |
| | C18 | -2.321E-07 | C36 | 0.000E+00 | C54 | 0.000E+00 | | |
| 4 | C1 | 0.000E+00 | C19 | -8.913E-10 | C37 | 0.000E+00 | C55 | 0.000E+00 |
| | C2 | 0.000E+00 | C20 | 3.667E-10 | C38 | 0.000E+00 | C56 | 0.000E+00 |
| | C3 | 0.000E+00 | C21 | 5.167E-10 | C39 | 0.000E+00 | C57 | 0.000E+00 |
| | C4 | 3.276E-03 | C22 | 8.749E-12 | C40 | 0.000E+00 | C58 | 0.000E+00 |
| | C5 | 3.484E-05 | C23 | 4.995E-12 | C41 | 0.000E+00 | C59 | 0.000E+00 |
| | C6 | 3.144E-03 | C24 | 3.223E-12 | C42 | 0.000E+00 | C60 | 0.000E+00 |
| | C7 | -7.438E-07 | C25 | -9.945E-12 | C43 | 0.000E+00 | C61 | 0.000E+00 |
| | C8 | -1.474E-06 | C26 | -1.366E-10 | C44 | 0.000E+00 | C62 | 0.000E+00 |
| | C9 | 1.307E-06 | C27 | 5.200E-10 | C45 | 0.000E+00 | C63 | 0.000E+00 |
| | C10 | -8.445E-06 | C28 | 4.390E-10 | C46 | 0.000E+00 | C64 | 0.000E+00 |
| | C11 | 1.726E-07 | C29 | -6.913E-14 | C47 | 0.000E+00 | C65 | 0.000E+00 |
| | C12 | 1.246E-09 | C30 | -1.058E-13 | C48 | 0.000E+00 | C66 | 0.000E+00 |
| | C13 | 3.366E-07 | C31 | 2.284E-13 | C49 | 0.000E+00 | | |
| | C14 | -2.242E-08 | C32 | -2.734E-12 | C50 | 0.000E+00 | | |
| | C15 | 9.088E-08 | C33 | 1.156E-12 | C51 | 0.000E+00 | | |
| | C16 | 2.113E-11 | C34 | 1.300E-13 | C52 | 0.000E+00 | | |
| | C17 | -5.606E-10 | C35 | -1.154E-11 | C53 | 0.000E+00 | | |
| | C18 | -4.687E-10 | C36 | -5.052E-13 | C54 | 0.000E+00 | | |

Fig.10

| SURFACE NUMBER | POLYNOMIAL COEFFICIENT | | | | | | |
|---|---|---|---|---|---|---|---|
| 5 | C1 | 0.000E+00 | C19 | 0.000E+00 | C37 | 7.431E-12 | C55 | 0.000E+00 |
| | C2 | 0.000E+00 | C20 | 0.000E+00 | C38 | 0.000E+00 | C56 | 0.000E+00 |
| | C3 | 0.000E+00 | C21 | 0.000E+00 | C39 | 0.000E+00 | C57 | 0.000E+00 |
| | C4 | 6.896E-03 | C22 | -8.792E-09 | C40 | 0.000E+00 | C58 | 0.000E+00 |
| | C5 | 0.000E+00 | C23 | 0.000E+00 | C41 | 0.000E+00 | C59 | 0.000E+00 |
| | C6 | 3.000E-03 | C24 | 0.000E+00 | C42 | 0.000E+00 | C60 | 0.000E+00 |
| | C7 | -7.751E-07 | C25 | 0.000E+00 | C43 | 0.000E+00 | C61 | 0.000E+00 |
| | C8 | 0.000E+00 | C26 | 0.000E+00 | C44 | 0.000E+00 | C62 | 0.000E+00 |
| | C9 | 0.000E+00 | C27 | 0.000E+00 | C45 | 0.000E+00 | C63 | 0.000E+00 |
| | C10 | 0.000E+00 | C28 | 0.000E+00 | C46 | 0.000E+00 | C64 | 0.000E+00 |
| | C11 | 1.007E-06 | C29 | -1.064E-10 | C47 | 0.000E+00 | C65 | 0.000E+00 |
| | C12 | 0.000E+00 | C30 | 0.000E+00 | C48 | 0.000E+00 | C66 | 0.000E+00 |
| | C13 | 0.000E+00 | C31 | 0.000E+00 | C49 | 0.000E+00 | | |
| | C14 | 0.000E+00 | C32 | 0.000E+00 | C50 | 0.000E+00 | | |
| | C15 | 0.000E+00 | C33 | 0.000E+00 | C51 | 0.000E+00 | | |
| | C16 | 4.451E-08 | C34 | 0.000E+00 | C52 | 0.000E+00 | | |
| | C17 | 0.000E+00 | C35 | 0.000E+00 | C53 | 0.000E+00 | | |
| | C18 | 0.000E+00 | C36 | 0.000E+00 | C54 | 0.000E+00 | | |
| 6 | C1 | 0.000E+00 | C19 | -2.017E-07 | C37 | 0.000E+00 | C55 | 0.000E+00 |
| | C2 | 0.000E+00 | C20 | -3.426E-07 | C38 | 0.000E+00 | C56 | 0.000E+00 |
| | C3 | 0.000E+00 | C21 | -3.197E-08 | C39 | 0.000E+00 | C57 | 0.000E+00 |
| | C4 | 1.172E-02 | C22 | -7.978E-09 | C40 | 0.000E+00 | C58 | 0.000E+00 |
| | C5 | 5.279E-05 | C23 | 1.726E-09 | C41 | 0.000E+00 | C59 | 0.000E+00 |
| | C6 | 1.006E-02 | C24 | 6.527E-09 | C42 | 0.000E+00 | C60 | 0.000E+00 |
| | C7 | -5.016E-06 | C25 | -1.786E-09 | C43 | 0.000E+00 | C61 | 0.000E+00 |
| | C8 | 1.122E-04 | C26 | -1.196E-08 | C44 | 0.000E+00 | C62 | 0.000E+00 |
| | C9 | 5.269E-05 | C27 | -1.176E-09 | C45 | 0.000E+00 | C63 | 0.000E+00 |
| | C10 | -7.688E-06 | C28 | -3.467E-09 | C46 | 0.000E+00 | C64 | 0.000E+00 |
| | C11 | -7.887E-07 | C29 | 7.118E-11 | C47 | 0.000E+00 | C65 | 0.000E+00 |
| | C12 | -4.386E-07 | C30 | -1.106E-10 | C48 | 0.000E+00 | C66 | 0.000E+00 |
| | C13 | 2.656E-06 | C31 | 1.099E-10 | C49 | 0.000E+00 | | |
| | C14 | -8.335E-07 | C32 | -2.118E-11 | C50 | 0.000E+00 | | |
| | C15 | -3.621E-08 | C33 | -1.026E-10 | C51 | 0.000E+00 | | |
| | C16 | -5.470E-08 | C34 | 6.644E-10 | C52 | 0.000E+00 | | |
| | C17 | -9.049E-09 | C35 | 1.374E-09 | C53 | 0.000E+00 | | |
| | C18 | 3.124E-09 | C36 | -4.097E-10 | C54 | 0.000E+00 | | |

Fig.11

| SURFACE NUMBER | POLYNOMIAL COEFFICIENT |||||||
|---|---|---|---|---|---|---|---|
| 7 | C1 | 0.000E+00 | C19 | -3.842E-08 | C37 | 0.000E+00 | C55 | 0.000E+00 |
| | C2 | 0.000E+00 | C20 | -1.849E-07 | C38 | 0.000E+00 | C56 | 0.000E+00 |
| | C3 | 0.000E+00 | C21 | -2.485E-07 | C39 | 0.000E+00 | C57 | 0.000E+00 |
| | C4 | 3.136E-04 | C22 | 8.556E-09 | C40 | 0.000E+00 | C58 | 0.000E+00 |
| | C5 | -2.169E-04 | C23 | 0.000E+00 | C41 | 0.000E+00 | C59 | 0.000E+00 |
| | C6 | 6.079E-03 | C24 | 0.000E+00 | C42 | 0.000E+00 | C60 | 0.000E+00 |
| | C7 | -2.700E-05 | C25 | 0.000E+00 | C43 | 0.000E+00 | C61 | 0.000E+00 |
| | C8 | 4.113E-04 | C26 | 0.000E+00 | C44 | 0.000E+00 | C62 | 0.000E+00 |
| | C9 | 1.150E-04 | C27 | 0.000E+00 | C45 | 0.000E+00 | C63 | 0.000E+00 |
| | C10 | -2.618E-05 | C28 | 0.000E+00 | C46 | 0.000E+00 | C64 | 0.000E+00 |
| | C11 | -7.927E-06 | C29 | 0.000E+00 | C47 | 0.000E+00 | C65 | 0.000E+00 |
| | C12 | -1.733E-09 | C30 | 0.000E+00 | C48 | 0.000E+00 | C66 | 0.000E+00 |
| | C13 | 3.665E-06 | C31 | 0.000E+00 | C49 | 0.000E+00 | | |
| | C14 | 2.682E-06 | C32 | 0.000E+00 | C50 | 0.000E+00 | | |
| | C15 | -5.990E-06 | C33 | 0.000E+00 | C51 | 0.000E+00 | | |
| | C16 | 2.575E-08 | C34 | 0.000E+00 | C52 | 0.000E+00 | | |
| | C17 | -3.223E-07 | C35 | 0.000E+00 | C53 | 0.000E+00 | | |
| | C18 | -3.450E-08 | C36 | 0.000E+00 | C54 | 0.000E+00 | | |
| 8 | C1 | 0.000E+00 | C19 | 4.354E-11 | C37 | 0.000E+00 | C55 | 0.000E+00 |
| | C2 | 0.000E+00 | C20 | -2.426E-12 | C38 | 0.000E+00 | C56 | 0.000E+00 |
| | C3 | 0.000E+00 | C21 | 2.001E-10 | C39 | 0.000E+00 | C57 | 0.000E+00 |
| | C4 | 1.875E-03 | C22 | -1.658E-14 | C40 | 0.000E+00 | C58 | 0.000E+00 |
| | C5 | 9.644E-06 | C23 | 1.852E-14 | C41 | 0.000E+00 | C59 | 0.000E+00 |
| | C6 | 1.459E-03 | C24 | 2.244E-14 | C42 | 0.000E+00 | C60 | 0.000E+00 |
| | C7 | 4.479E-08 | C25 | 5.973E-14 | C43 | 0.000E+00 | C61 | 0.000E+00 |
| | C8 | -1.425E-06 | C26 | 5.685E-13 | C44 | 0.000E+00 | C62 | 0.000E+00 |
| | C9 | 9.403E-09 | C27 | -1.325E-13 | C45 | 0.000E+00 | C63 | 0.000E+00 |
| | C10 | -1.516E-06 | C28 | 7.800E-13 | C46 | 0.000E+00 | C64 | 0.000E+00 |
| | C11 | 3.254E-09 | C29 | -5.929E-18 | C47 | 0.000E+00 | C65 | 0.000E+00 |
| | C12 | -1.204E-09 | C30 | 1.870E-16 | C48 | 0.000E+00 | C66 | 0.000E+00 |
| | C13 | -3.798E-09 | C31 | -1.722E-16 | C49 | 0.000E+00 | | |
| | C14 | -3.061E-09 | C32 | 2.642E-16 | C50 | 0.000E+00 | | |
| | C15 | -2.177E-09 | C33 | -2.677E-15 | C51 | 0.000E+00 | | |
| | C16 | -7.157E-13 | C34 | -2.193E-15 | C52 | 0.000E+00 | | |
| | C17 | -1.439E-11 | C35 | 1.407E-14 | C53 | 0.000E+00 | | |
| | C18 | 1.152E-11 | C36 | -2.556E-14 | C54 | 0.000E+00 | | |

Fig. 12

| SURFACE NUMBER | | POLYNOMIAL COEFFICIENT | | | | | |
|---|---|---|---|---|---|---|---|
| 9 | C1 | 0.000E+00 | C19 | 6.182E-11 | C37 | 0.000E+00 | C55 | 0.000E+00 |
| | C2 | -2.253E-01 | C20 | -1.335E-10 | C38 | 0.000E+00 | C56 | 0.000E+00 |
| | C3 | 1.869E+00 | C21 | 8.898E-11 | C39 | 0.000E+00 | C57 | 0.000E+00 |
| | C4 | 9.372E-04 | C22 | -2.235E-14 | C40 | 0.000E+00 | C58 | 0.000E+00 |
| | C5 | 1.365E-04 | C23 | 1.275E-13 | C41 | 0.000E+00 | C59 | 0.000E+00 |
| | C6 | 1.346E-04 | C24 | 1.360E-13 | C42 | 0.000E+00 | C60 | 0.000E+00 |
| | C7 | 5.394E-07 | C25 | 1.067E-14 | C43 | 0.000E+00 | C61 | 0.000E+00 |
| | C8 | -8.659E-07 | C26 | -3.107E-13 | C44 | 0.000E+00 | C62 | 0.000E+00 |
| | C9 | 6.722E-07 | C27 | 5.272E-12 | C45 | 0.000E+00 | C63 | 0.000E+00 |
| | C10 | 1.628E-06 | C28 | -1.133E-12 | C46 | 0.000E+00 | C64 | 0.000E+00 |
| | C11 | 2.591E-09 | C29 | 8.694E-17 | C47 | 0.000E+00 | C65 | 0.000E+00 |
| | C12 | -3.907E-09 | C30 | 9.861E-16 | C48 | 0.000E+00 | C66 | 0.000E+00 |
| | C13 | -1.978E-09 | C31 | -8.974E-16 | C49 | 0.000E+00 | | |
| | C14 | -2.171E-08 | C32 | -9.711E-16 | C50 | 0.000E+00 | | |
| | C15 | 5.617E-09 | C33 | -3.091E-15 | C51 | 0.000E+00 | | |
| | C16 | -1.473E-11 | C34 | 1.488E-14 | C52 | 0.000E+00 | | |
| | C17 | -1.445E-11 | C35 | -2.307E-16 | C53 | 0.000E+00 | | |
| | C18 | 1.059E-11 | C36 | -4.410E-17 | C54 | 0.000E+00 | | |

Fig. 13

| SIZE OF VIRTUAL IMAGE | X | 17500 |
| --- | --- | --- |
| | Y | 7500 |
| DISTANCE FROM EYE OF OBSERVER TO VIRTUAL IMAGE | | 100000 |

Fig. 14

| | FIRST EXAMPLE |
| --- | --- |
| $|\theta 1|$ | 34.20 |
| $|\theta 2|$ | 30.00 |
| $|\theta 1/\theta 2|$ | 1.14 |
| $\theta 1 \times \theta 2$ | -1026 |

HEAD-UP DISPLAY AND MOBILE BODY EQUIPPED WITH HEAD-UP DISPLAY

CROSS-REFERENCE TO RELATED APPLICATIONS

This is a continuation application of International Application No. PCT/JP20181033200, with an international filing date of Sep. 7, 2018, which claims priority of Japanese Patent Application No. 2018-030523 filed on Feb. 23, 2018, the content of which is incorporated herein by reference.

BACKGROUND OF THE INVENTION

1. Technical Field

The present disclosure relates to a head-up display, and a mobile body equipped with a head-up display.

2. Description of Related Art

JP 2017-120388 A discloses a head-up display which projects an image on a windshield. This head-up display includes a display device which has a display surface and displays a display image on the display surface, a concave mirror, and a lens having a light condensing function and disposed between the concave mirror and the display surface. This head-up display also includes a first optical system which forms an intermediate image by enlarging a display image of light emitted from the display surface and formed via the lens and the concave mirror. This head-up display further includes a second optical system which projects the intermediate image on the windshield. The intermediate image formed by the first optical system is larger than a display image displayed on the display surface by the display device. In this manner, size reduction of the first optical system and the second optical system is attempted.

SUMMARY

The present disclosure provides a head-up display achieving size reduction and effectively reducing stray light generated by external light.

A head-up display of the present disclosure is a head-up display that projects a display image on a transparent reflecting member to present a visually recognizable virtual image. The head-up display includes: a display device that displays the display image; and a projection optical system that projects the display image displayed on the display device as a virtual image for an observer. On an assumption that light reaching a center of a viewpoint region of the observer and corresponding to a center of the virtual image is reference light, the projection optical system includes a prism element that has an incident surface, a reflection surface, and an emitting surface different from the incident surface sequentially in an optical path from the display device. The emitting surface is inclined to the reference light. An inclination amount $\theta_2$ of the reference light emitted from the emitting surface with respect to the emitting surface lies in a range of $15° < |\theta_2| < 45°$ in the optical path from the display device.

The head-up display according to the present disclosure presents a virtual image with less distortion, achieves size reduction, and effectively reduces stray light generated by external light.

BRIEF DESCRIPTION OF THE DRAWINGS

FIG. 7 is a diagram showing eccentricity data associated with each surface of an optical system in a first example (corresponding to the first embodiment).

FIG. 8 is a diagram showing a radius of curvature of each surface of the optical system in the first example (corresponding to the first embodiment).

FIG. 9 is a diagram showing data associated with a shape of a free-form surface in the optical system in the first example (corresponding to the first embodiment).

FIG. 10 is a diagram showing data associated with the shape of the free-form surface in the optical system in the first example (corresponding to the first embodiment).

FIG. 11 is a diagram showing data associated with the shape of the free-form surface in the optical system in the first example (corresponding to the first embodiment).

FIG. 12 is a diagram showing data associated with the shape of the free-form surface in the optical system in the first example (corresponding to the first embodiment).

FIG. 13 is a diagram showing data associated with a head-up display in the first example.

FIG. 14 is a diagram showing data associated with the head-up display in the first example.

DETAILED EMBODIMENTS

Embodiments will hereinafter be described in detail with reference to the drawings as appropriate. Note that excessively detailed descriptions may be omitted. For example, detailed descriptions of well-known matters and repeated explanation on substantially identical configurations may be omitted. These omissions are made to avoid unnecessary redundancy of the following description, and to help easy understanding by those skilled in the art.

Note that the inventor(s) provides the accompanying drawings and the following description to help those skilled in the art sufficiently understand the present disclosure. The drawings and description are therefore not intended to limit the subject matters claimed in the appended claims.

First Embodiment

A first embodiment will be hereinafter described with reference to FIGS. 1 to 4.
[1-1. Configuration]
[1-1-1. Overall Configuration of Head-Up Display]

Figure 1:
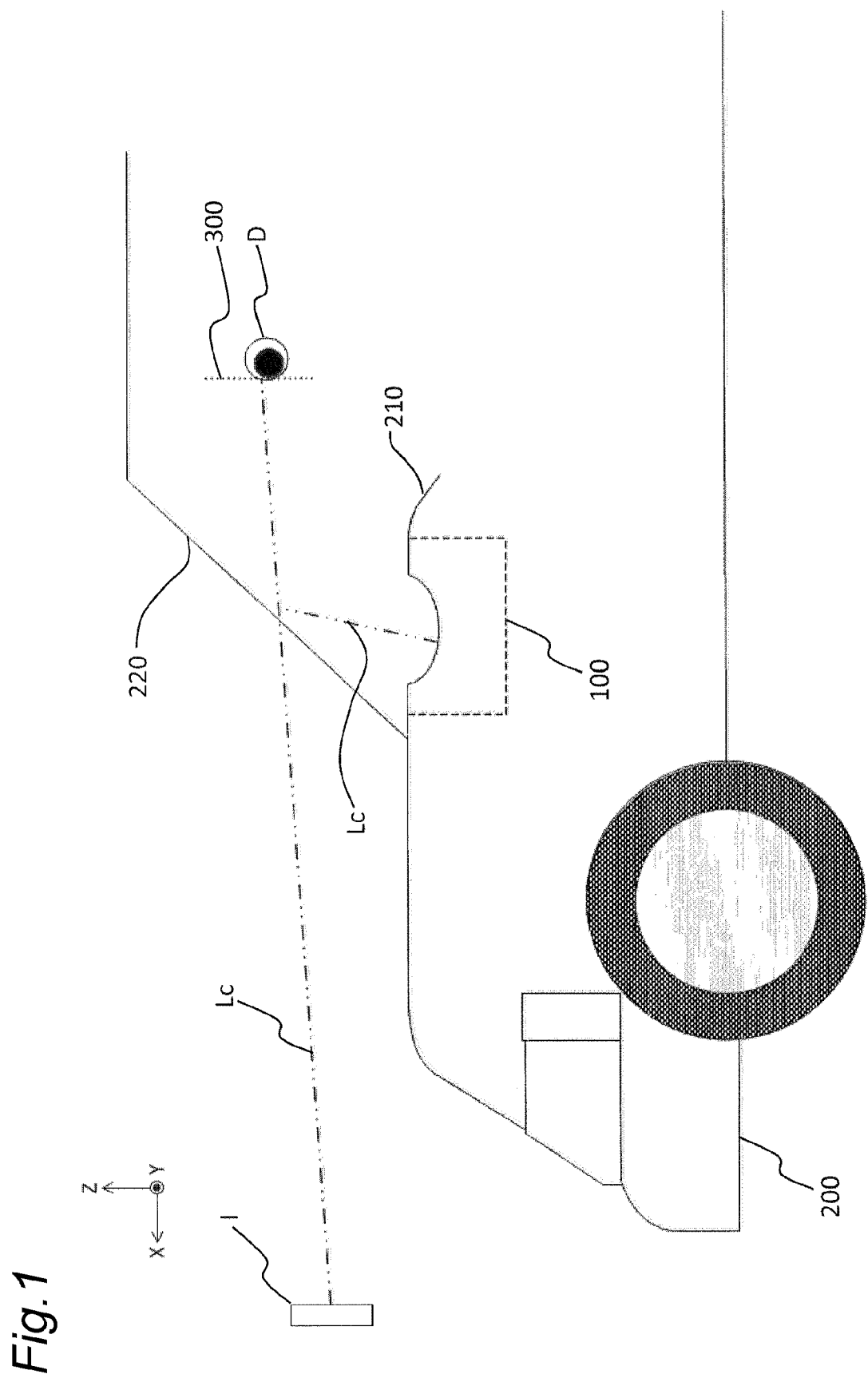
FIG. 1 is a schematic diagram for explaining a vehicle equipped with a head-up display according to a first embodiment.

Specific embodiments and examples of a head-up display 100 of the present disclosure will be hereinafter described with reference to the drawings, FIG. 1 is a diagram showing a cross section of a vehicle 200 equipped with the head-up display 100 according to the present disclosure. As shown in FIG. 1, the head-up display 100 is disposed inside a dashboard 210 below a windshield 220 of the vehicle 200. An observer D recognizes a display image projected from the head-up display 100 as a virtual image I.

Figure 2:
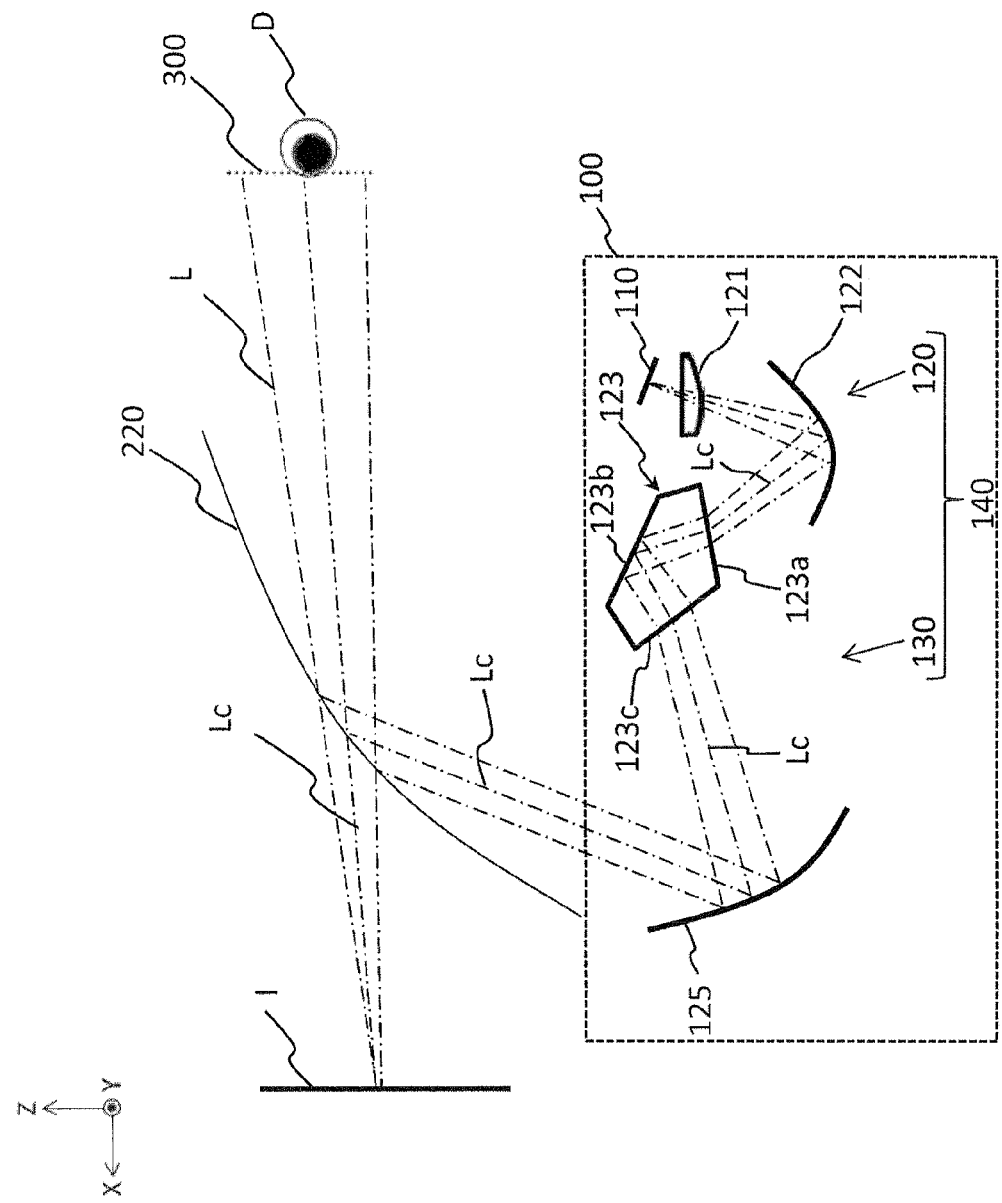
FIG. 2 is a schematic diagram showing a configuration of the head-up display according to the first embodiment.
Figure 3:
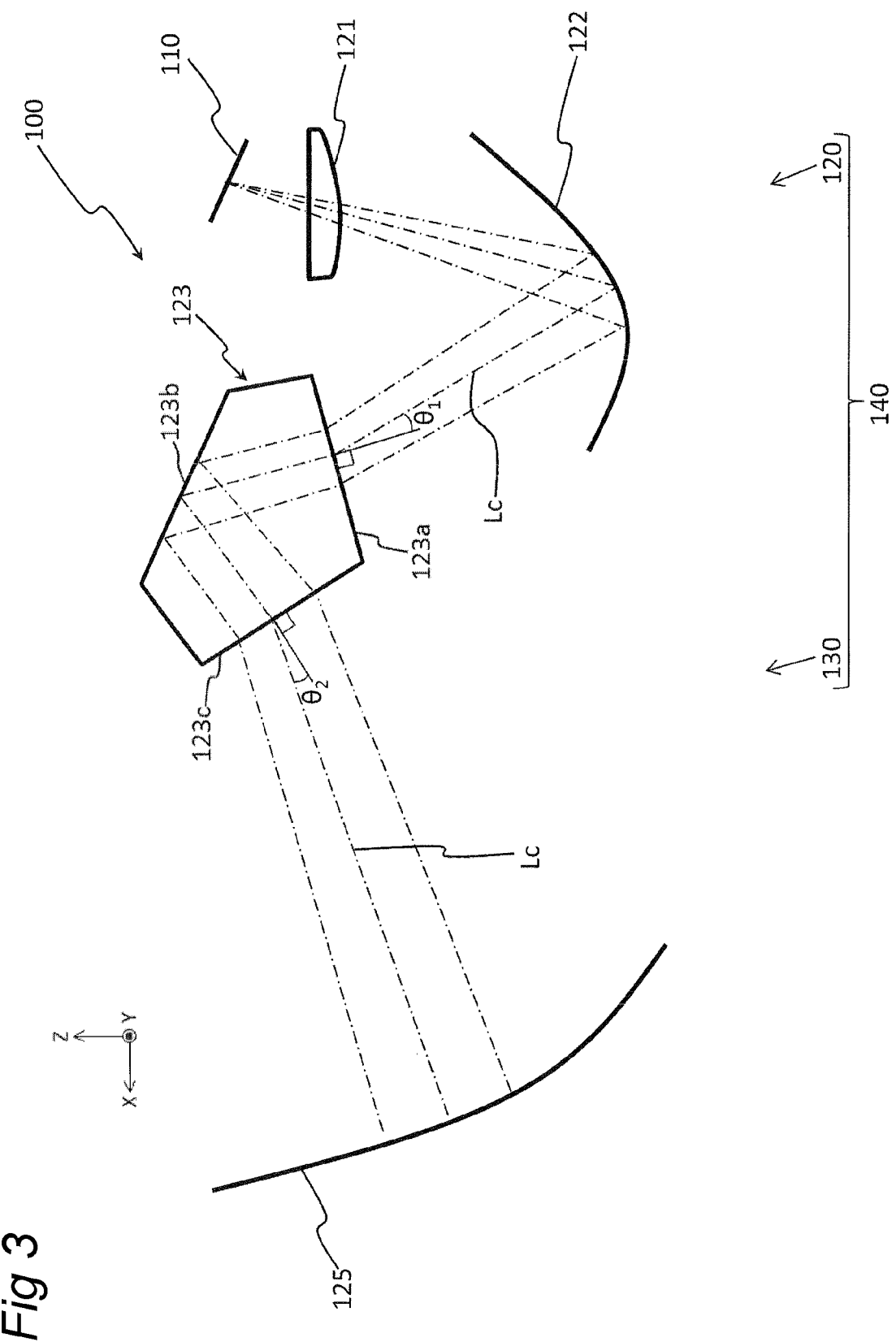
FIG. 3 is a schematic diagram for explaining a projection optical system of the head-up display according to the first embodiment.

FIG. 2 is a schematic diagram showing a configuration of the head-up display 100 according to the present embodiment. FIG. 3 is a schematic diagram for explaining a projection optical system of the head-up display 100 according to the present embodiment.

As shown in FIG. 2, the head-up display 100 includes a display device 110 and a projection optical system 140. The display device 110 of the head-up display 100 is an optical member having a diffusion characteristic, and projects, on the windshield 220, a display image to be displayed on the display device 110. Projected light is reflected on the windshield 220 and guided to a viewpoint region 300 of the observer D. In this manner, the head-up display 100 allows the observer D to visually recognize the virtual image I. The viewpoint herein is a principal point when the eye of the observer D is considered as a lens. The viewpoint region 300 is a region where the viewpoint of the observer D is located, and corresponds to an area where the virtual image I is visually recognizable without any missing parts.

According to the present disclosure, it is defined herein that a front corresponds to a direction where the windshield 220 of the vehicle 200 is located as viewed from the observer D. A rear corresponds to a direction opposite to the front. In addition, a lower side corresponds to a direction of a ground where the vehicle 200 travels. An upper side corresponds to a direction opposite to the lower side. An inside is a passenger's seat side as viewed from the observer D on a driver's seat. An outside corresponds to a direction opposite to the inside. Moreover, the viewpoint region 300 is a region where the observer D can visually recognize the virtual image I without any missing parts.

It is assumed herein that light emitted from the display device 110 and reaching a center of the viewpoint region 300 is referred to as light L as shown in FIG. 2. In addition, it is assumed that light emitted from the display device 110, passing through a central portion of the virtual image I, and reaching the center of the viewpoint region 300 is referred to as reference light Lc. That is, the reference light Lc corresponds to an optical path from the center of the virtual image I to the viewpoint of the observer D when viewed from the observer D. In fact, the reference light Lc visually recognized by the observer D is light reaching the observer D from the display device 110 via the optical system. Therefore, light which corresponds to the reference light Lc emitted from the center of the virtual image I, and reaches the observer D from the display device 110 is also expressed as the reference light Lc. In addition, optical paths corresponding to these lights are similarly expressed as the reference light Lc. It is assumed that the viewpoint of the observer D is located at the center of the viewpoint region 300.

The display device 110 displays a display image under control by a control unit such as a not-shown CPU. For example, the display device 110 may be constituted by a liquid crystal display device with a backlight (liquid crystal display), an organic light-emitting diode, a plasma display, or the like. In addition, the display device 110 may include a screen that diffuses or reflects light, and a projector or a scanning laser to form a display image. The display device 110 can display various information such as road proceeding guidance display, a distance to a vehicle in front, a remaining battery level of the vehicle, and a current vehicle speed. Moreover, the display device 110 may electronically distort a display image in advance in accordance with distortion caused in a projecting optical system 130 and the windshield 220, and/or a position of the observer D acquired by a not-shown camera. This configuration allows the observer D to visually recognize the preferable virtual image I. Furthermore, the display device 110 may display an image while shifting display pixels having a plurality of wavelengths for each display position in advance in accordance with chromatic aberration caused in the projecting optical system 130. This configuration allows the observer D to visually recognize the preferable virtual image I.

The projection optical system 140 includes a relay optical system 120 and the projecting optical system 130. The relay optical system 120 includes the display device 110 which is an optical member having a diffusion characteristic, a first lens 121 having a light condensing function, and a first mirror 122. The relay optical system 120 enlarges a display image displayed on a screen of the display device 110 which is an optical member having a diffusion characteristic. Therefore, the screen size of the display device 110 can be reduced. Moreover, the magnification of the projecting optical system 130 can be reduced. In this manner, positive power of a second mirror 125 of the projecting optical system 130 can be lowered, and screen distortion can be reduced.

Light condensed by the first lens 121 and reflected by the first mirror 122 is refracted by an incident surface 123a of a free-form surface prism 123 to correct aberration.

The projecting optical system 130 includes the incident surface 123a of the free-form surface prism 123, a reflection surface 123b, and an emitting surface 123c of the free-form surface prism 123, and a second mirror 125. The projecting optical system 130 reflects, via the reflection surface 123b of the free-form surface prism 123, a display image enlarged by the relay optical system 120, refracts the display image via the emitting surface of the free-form surface prism 123, and then reflects the display image via the second mirror 125 to project the display image on the windshield 220.

[1-1-2. Arrangement Configuration of Projecting Optical System, Relay Optical System, and Display Apparatus]

According to the projection optical system 140 of the present embodiment, the first mirror 122, the incident surface 123a of the free-form surface prism 123 which is a prism element, the reflection surface 123b of the free-form surface prism 123, the emitting surface 123c of the free-form surface prism 123, and the second mirror 125 are sequentially disposed in an optical path from the display device 110.

Each of the first mirror 122 and the second mirror 125 has a free-form surface shape. This shape is adopted to correct distortion of a virtual image caused by reflection. In addition, each of the incident surface 123a, the reflection surface 123b, and the emitting surface 123c of the free-form surface prism 123 has a free-form surface shape. This shape is adopted to correct astigmatism caused by refraction on the incident surface 123a and the emitting surface 123c, and distortion of a virtual image caused on the reflection surface 123b.

While the prism element of the present embodiment adopts the free-form surface shape for all of the incident surface 123a, the reflection surface 123b, and the emitting surface 123c, a prism element which does not adopt the free-curved surface shape for these surfaces may be used. In addition, the free-form surface may be adopted for at least one of the incident surface 123a, the reflection surface 123b, and the emitting surface 123c.

As shown in FIG. 3, the incident surface 123a of the free-form surface prism 123 is inclined at an angle $|\theta_1|$ to the reference light Lc in the clockwise direction in an X-Z plan view of FIG. 3. Moreover, as shown in FIG. 3, the emitting surface 123c of the free-form surface prism 123 is inclined at an angle $|\theta_2|$ to the reference light Lc in the counterclockwise direction in the X-Z plan view of FIG. 3. Assuming that the clockwise direction with respect to the reference light Lc is positive, the angle $\theta_1$ is a positive angle, and the angle $\theta_2$ is a negative angle. This configuration can prevent stray light generated by external light entering a casing and reflected by the display surface of the display device 110 or reflected by the first mirror 122 while lowering aberration caused by refraction.

Note that the angle $\theta_1$ may be a negative angle when the clockwise direction with respect to the reference light Lc is positive. In this case, the angle 82 is set to a positive angle.

Aberration deteriorates as the incident surface 123a and the emitting surface 123c of the free-form surface prism 123 are further inclined to the reference light Lc. Sunlight is more directly viewed as the angle at which the incident surface 123a and the emitting surface 123c cross the reference light Lc becomes closer to the right angle. According to the present embodiment, therefore, an upper limit and a lower limit are defined for the incident surface 123a and the emitting surface 123c as follows.

$$15° < |\theta_1| < 45°$$

$$15° < |\theta_2| < 45°$$

Moreover, aberration can be reduced when the angle $|\theta_1|$ of the incident surface 123a and the angle $|\theta_2|$ of the emitting surface 123c are equalized. According to the present embodiment, the following relationship is established between the angle $|\theta_1|$ of the incident surface 123a and the angle $|\theta_2|$ of the emitting surface 123c to equalize an optical path length from the incident surface 123a to the reflection surface 123b with an optical path length from the reflection surface 123b to the emitting surface 123c while reducing aberration.

$$0.7 < |\theta_1/\theta_2| < 1.3$$

$$\theta_1 \times \theta_2 < 0$$

Note that, with respect to the reference light Lc, the clockwise direction is positive and the counterclockwise direction is negative in the above expressions.

It is preferable that both the incident surface 123a and the emitting surface 123c are inclined to the reference light Lc. However, it is sufficient that at least either the incident surface 123a or the emitting surface 123c is inclined. This is because reduction of stray light is achievable even when only either the incident surface 123a or the emitting surface 123c is inclined.

A projection optical system of a head-up display includes an optical system further having two mirrors between the first mirror 122 and the second mirror 125 to form an intermediate image. According to the present embodiment, however, these two mirrors are combined by the free-form surface prism 123. In this case, light from the display device 110 is refracted using the incident surface 123a and the emitting surface 123c of the free-form surface prism 123 to produce a plurality of aberration correction effects using one element. In this manner, size reduction of the head-up display is achievable.

Moreover, the incident surface 123a and the emitting surface 123c of the free-form surface prism 123 are inclined clockwise and counterclockwise with respect to the reference light Lc, respectively. Accordingly, external light reflected on the incident surface 123a is reflected downward by the first mirror 122, while external light reflected on the emitting surface 123c is reflected downward by the second mirror 125. In this manner, entrance of external light into the viewpoint region 300 is avoidable.

[1-2. Effects and Others]

The head-up display 100 presented by way of example of the head-up display according to the first embodiment is a head-up display which allows the observer D to visually recognize the virtual image I. The head-up display 100 includes the display device 110 as an example of a display device, and the projection optical system 140. The projection optical system 140 includes the free-form surface prism 123 having the incident surface 123a, the reflection surface 123b, and the emitting surface 123c of the free-form surface prism 123 sequentially in the optical path from the display device 110. At least either the incident surface 123a or the emitting surface 123c is inclined to the reference light Lc. Accordingly, the free-form surface prism 123 reduces aberration, and also reduces stray light generated by reflection of external light on the first mirror 122 and the like even when the external light enters the projection optical system 140. Moreover, according to the present embodiment, the free-form surface prism 123 in which two mirrors forming an intermediate image are integrated without providing these two mirrors has been used. This configuration therefore shortens the total length of the projection optical system 140, thereby achieving size reduction of the head-up display 100.

The head-up display 100 according to the first embodiment has the free-form surface prism 123 as a prism element, and thus achieves preferable optical characteristics while reducing reflection of external light in an imaging optical system such as the head-up display 100.

Second Embodiment

A second embodiment will be subsequently described with reference to FIG. 4.

[2-1. Configuration]

Figure 4:
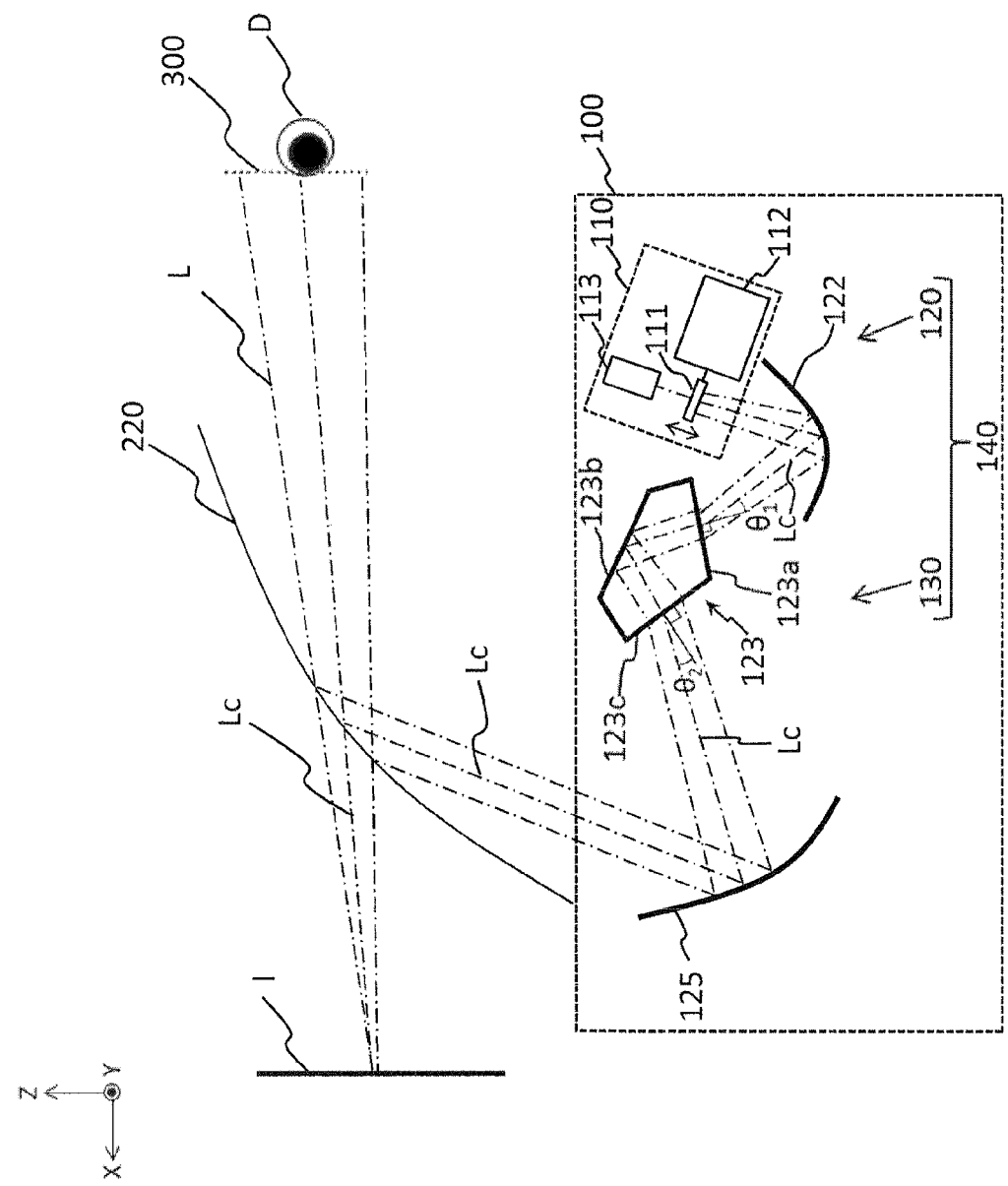
FIG. 4 is a schematic diagram showing a configuration of a head-up display according to a second embodiment.

FIG. 4 is a diagram showing a configuration of the head-up display 100 according to the second embodiment. As shown in FIG. 4, according to the head-up display 100 of the present embodiment, the display device 110 includes a screen 111, a drive unit 112 that drives the screen 111, and a scanning laser 113.

Display image information is controlled by a control unit such as a not-shown microcomputer in the display device 110. Various information such as road proceeding guidance display, a distance to a vehicle in front, a remaining battery level of the vehicle, and a current vehicle speed can be displayed as display image information. A projector that projects a display image on the screen 111, or a scanning laser is used as a light source of the display device 110. The scanning laser 113 scans a surface of the screen 111 to form a display image. The drive unit 112 is a drive device that moves the screen 111 along the reference light Lc. A distance from the observer D to the virtual image I can be adjusted by moving the screen 111 along the reference light Lc using the drive unit 112. For example, the virtual image I can be moved away from the observer D by moving the screen 111 in a direction away from the relay optical system 120.

Moreover, the drive unit 112 moves in accordance with a scanning position of the scanning laser 113 on the screen 111. In this manner, the virtual image I can be drawn in any plane regardless of an emitting angle of the screen 111 for emitting the reference light Lc. For example, the virtual image I can be drawn in a plane inclined to the observer D by synchronizing a drawing cycle of the scanning laser 113 and a swing cycle of the screen 111. Further, the virtual image I can be three-dimensionally displayed by moving the screen 111 back and forth in the direction of the reference light Lc at several tens of Hz.

According to the projection optical system 140 of the present embodiment, the first mirror 122, the incident surface 123*a* of the free-form surface prism 123 which is a prism element, the reflection surface 123*b* of the free-form surface prism 123, the emitting surface 123*c* of the free-form surface prism 123, and the second mirror 125 are sequentially disposed in the optical path from the display device 110.

Each of the first mirror 122 and the second mirror 125 has a free-form surface shape. This shape is adopted to correct distortion of a virtual image caused by reflection. In addition, each of the incident surface 123*a*, the reflection surface 123*b*, and the emitting surface 123*c* of the free-form surface prism 123 has a free-form surface shape. This shape is adopted to correct astigmatism caused by refraction on the incident surface 123*a* and the emitting surface 123*c*, and distortion of a virtual image caused on the reflection surface 123*b*.

While the prism element of the present embodiment adopts the free-form surface shape for all of the incident surface 123*a*, the reflection surface 123*b*, and the emitting surface 123*c*, a prism element which does not adopt the free-curved surface shape for these surfaces may be used. In addition, the free-form surface may be adopted for at least one of the incident surface 123*a*, the reflection surface 123*b*, and the emitting surface 123*c*.

As shown in FIG. 4, the incident surface 123*a* of the free-form surface prism 123 is inclined at an angle $|\theta_1|$ to the reference light Lc in the clockwise direction in an X-Z plan view of FIG. 4. Moreover, as shown in FIG. 4, the emitting surface 123*c* of the free-form surface prism 123 is inclined at an angle $|\theta_2|$ to the reference light Lc in the counterclockwise direction in the X-Z plan view of FIG. 4. This configuration can prevent stray light generated by external light entering the casing and reflected on the emitting surface 123*c*.

Aberration deteriorates as the incident surface 123*a* and the emitting surface 123*c* of the free-form surface prism 123 are further inclined to the reference light Lc. Sunlight is more directly viewed as the angle at which the incident surface 123*a* and the emitting surface 123*c* cross the reference light Lc becomes closer to the right angle. According to the present embodiment, therefore, the foregoing upper limit and lower limit are defined for the incident surface 123*a* and the emitting surface 123*c*, similarly to the first embodiment.

Moreover, aberration can be reduced when the angle $|\theta_1|$ of the incident surface 123*a* and the angle $|\theta_2|$ of the emitting surface 123*c* are equalized. According to the present embodiment, a relationship similar to the corresponding relationship of the first embodiment is established between the angle $|\theta_1|$ of the incident surface 123*a* and the angle $|\theta_2|$ of the emitting surface 123*c* to equalize the optical path length from the incident surface 123*a* to the reflection surface 123*b* with the optical path length from the reflection surface 123*b* to the emitting surface 123*c* while reducing aberration.

It is preferable that both the incident surface 123*a* and the emitting surface 123*c* are inclined to the reference light Lc. However, it is sufficient that at least either the incident surface 123*a* or the emitting surface 123*c* is inclined. This is because reduction of stray light is achievable even when only either the incident surface 123*a* or the emitting surface 123*c* is inclined.

A projection optical system of a head-up display includes an optical system further having two mirrors between the first mirror 122 and the second mirror 125 to form an intermediate image. According to the present embodiment, however, these two mirrors are combined by the free-form surface prism 123. In this case, light from the display device 110 is refracted using the incident surface 123*a* and the emitting surface 123*c* of the free-form surface prism 123 to produce a plurality of aberration correction effects using one element. In this manner, size reduction of the head-up display is achievable.

Moreover, the incident surface 123*a* and the emitting surface 123*c* of the free-form surface prism 123 are inclined clockwise and counterclockwise with respect to the reference light Lc, respectively. Accordingly, external light reflected on the incident surface 123*a* is reflected downward by the first mirror 122, while external light reflected on the emitting surface 123*c* is reflected downward by the second mirror 125. In this manner, entrance of external light into the viewpoint region 300 is avoidable.

[2-2. Effects and Others]

The head-up display 100 presented by way of example of the head-up display according to the second embodiment is a head-up display which allows the observer D to visually recognize the virtual image I including three-dimensional display. The head-up display 100 includes the display device 110 as an example of a display device, and the projection optical system 140. The projection optical system 140 includes the free-form surface prism 123 having the incident surface 123*a*, the reflection surface 123*b*, and the emitting surface 123*c* of the free-form surface prism 123 sequentially in the optical path from the display device 110. At least either the incident surface 123*a* or the emitting surface 123*c* is inclined to the reference light Lc. Accordingly, the free-form surface prism 123 reduces aberration, and also reduces stray light generated by reflection of external light on the first mirror 122 and the like even when the external light enters the projection optical system 140. Moreover, according to the present embodiment, the free-form surface prism 123 in which two mirrors forming an intermediate image have been integrated without providing these two mirrors has been used. This configuration therefore shortens the total length of the projection optical system 140, thereby achieving size reduction of the head-up display 100.

The head-up display 100 according to the second embodiment has the free-form surface prism 123 as a prism element, and therefore achieves preferable optical characteristics while reducing reflection of external light in an imaging optical system such as the head-up display 100.

Third Embodiment

A third embodiment will be subsequently described with reference to FIG. 5.

[3-1. Configuration]

Figure 5:
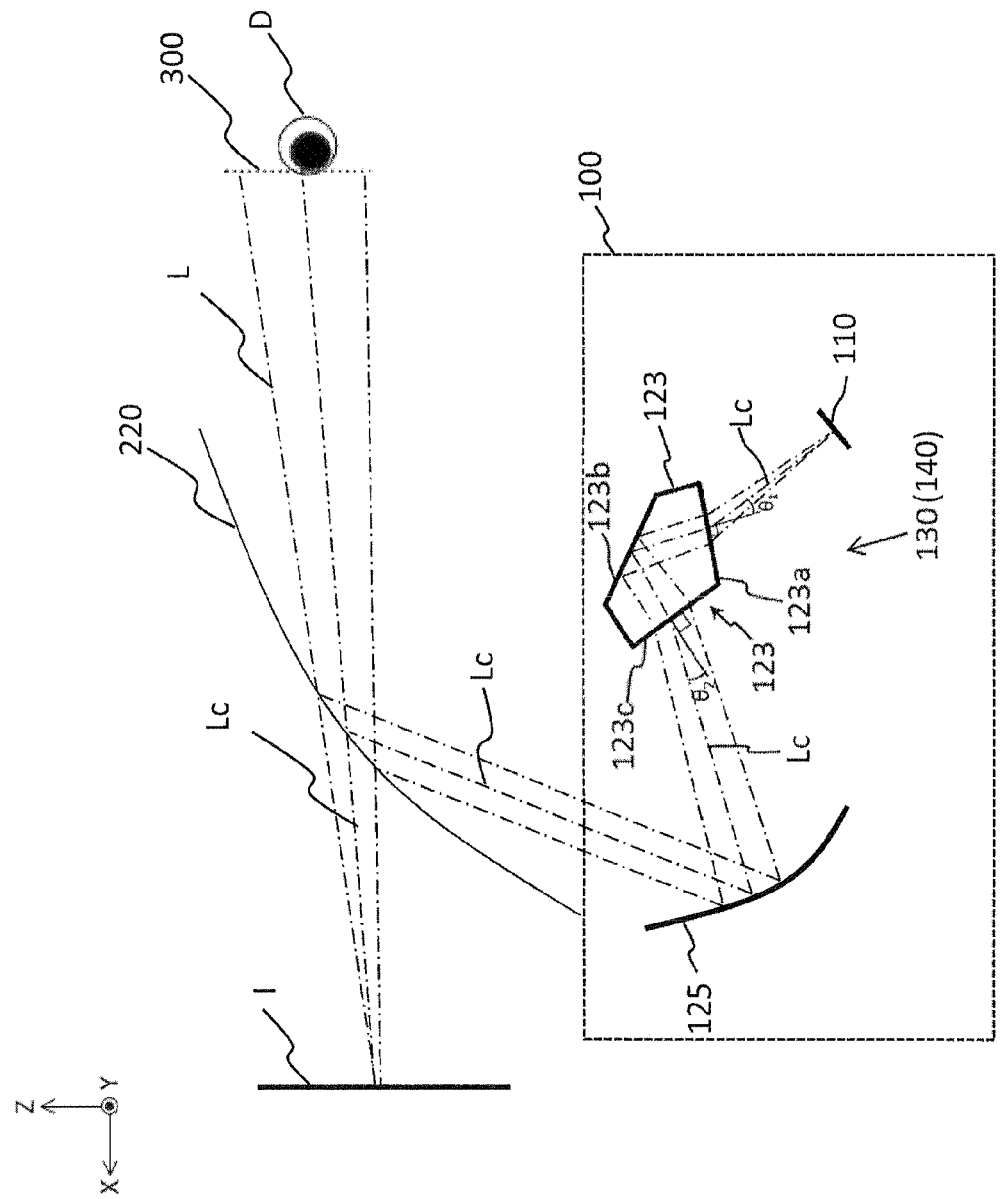
FIG. 5 is a schematic diagram showing a configuration of a head-up display according to a third embodiment.

FIG. 5 is a schematic diagram showing a configuration of the head-up display 100 according to the third embodiment. As shown in FIG. 5, the head-up display 100 of the present embodiment does not include a relay optical system.

As shown in FIG. 5, the display device 110 of the head-up display 100 according to the present embodiment is disposed in such a position as to face the incident surface 123*a* of the free-form surface prism 123. Light emitted from the display device 110 directly enters the incident surface 123a of the free-form surface prism 123.

According to the projection optical system 140 of the present embodiment, the incident surface 123a of the free-form surface prism 123 which is a prism element, the reflection surface 123b of the free-form surface prism 123, the emitting surface 123c of the free-form surface prism 123, and the second mirror 125 are sequentially disposed in the optical path from the display device 110.

The second mirror 125 has a free-form surface shape. This shape is adopted to correct distortion of a virtual image caused by reflection. In addition, each of the incident surface 123a, the reflection surface 123b, and the emitting surface 123c of the free-form surface prism 123 has a free-form surface shape. This shape is adopted to correct astigmatism caused by refraction on the incident surface 123a and the emitting surface 123c, and distortion of a virtual image caused on the reflection surface 123b.

While the prism element of the present embodiment adopts the free-form surface shape for all of the incident surface 123a, the reflection surface 123b, and the emitting surface 123c, a prism element which does not adopt the free-curved surface shape for these surfaces may be used. In addition, the free-form surface may be adopted for at least one of the incident surface 123a, the reflection surface 123b, and the emitting surface 123c.

As shown in FIG. 5, the incident surface 123a of the free-form surface prism 123 is inclined at an angle $\theta_1$ to the reference light Lc in the clockwise direction in an X-Z plan view of FIG. 5. Moreover, as shown in FIG. 5, the emitting surface 123c of the free-form surface prism 123 is inclined at an angle $|\theta_2|$ to the reference light Lc in the counterclockwise direction in the X-Z plan view of FIG. 5. This configuration can prevent stray light generated by external light entering the casing and reflected on the emitting surface 123c.

Aberration deteriorates as the incident surface 123a and the emitting surface 123c of the free-form surface prism 123 are further inclined to the reference light Lc. Sunlight is more directly viewed as the angle at which the incident surface 123a and the emitting surface 123c cross the reference light Lc becomes closer to the right angle. According to the present embodiment, therefore, the foregoing upper limit and lower limit are defined for the incident surface 123a and the emitting surface 123c, similarly to the first embodiment.

Moreover, aberration can be reduced when the angle $|\theta_1|$ of the incident surface 123a and the angle $|\theta_2|$ of the emitting surface 123c are equalized. According to the present embodiment, a relationship similar to the corresponding relationship of the first embodiment is established between the angle $|\theta_1|$ of the incident surface 123a and the angle $|\theta_2|$ of the emitting surface 123c to equalize the optical path length from the incident surface 123a to the reflection surface 123b with the optical path length from the reflection surface 123b to the emitting surface 123c while reducing aberration.

It is preferable that both the incident surface 123a and the emitting surface 123c are inclined to the reference light Lc. However, it is sufficient that at least either the incident surface 123a or the emitting surface 123c is inclined. This is because reduction of stray light is achievable even when only either the incident surface 123a or the emitting surface 123c is inclined.

A projection optical system of a head-up display includes an optical system further having two mirrors between the display device 110 and the second mirror 125 to form an intermediate image. According to the present embodiment, however, these two mirrors are combined by the free-form surface prism 123. In this case, light from the display device 110 is refracted using the incident surface 123a and the emitting surface 123c of the free-form surface prism 123 to produce a plurality of aberration correction effects using one element. In this manner, size reduction of the head-up display is achievable.

Moreover, the incident surface 123a and the emitting surface 123c of the free-form surface prism 123 are inclined clockwise and counterclockwise with respect to the reference light Lc, respectively. Accordingly, external light reflected on the incident surface 123a is reflected downward by the first mirror 122, while external light reflected on the emitting surface 123c is reflected downward by the second mirror 125. In this manner, entrance of external light into the viewpoint region 300 is avoidable.

[3-2. Effects and Others]

The head-up display 100 presented by way of example of the head-up display according to the third embodiment is a head-up display which allows the observer D to visually recognize the virtual image I. The head-up display 100 includes the display device 110 as an example of a display device, and the projection optical system 140. The projection optical system 140 includes the free-form surface prism 123 having the incident surface 123a, the reflection surface 123b, and the emitting surface 123c of the free-form surface prism 123 sequentially in the optical path from the display device 110. At least either the incident surface 123a or the emitting surface 123c is inclined to the reference light Lc. Accordingly, the free-form surface prism 123 reduces aberration, and also reduces stray light generated by reflection of external light on the display device 110 and the like even when the external light enters the projection optical system 140. Moreover, according to the present embodiment, the free-form surface prism 123 in which two mirrors forming an intermediate image are integrated without providing these two mirrors has been used. This configuration therefore shortens the total length of the projection optical system 140, thereby achieving size reduction of the head-up display 100.

The head-up display 100 according to the third embodiment has the free-form surface prism 123 as a prism element, and therefore achieves preferable optical characteristics while reducing reflection of external light in an imaging optical system such as the head-up display 100.

Fourth Embodiment

A fourth embodiment will be subsequently described with reference to FIG. 6.

[4-1. Configuration]

Figure 6:
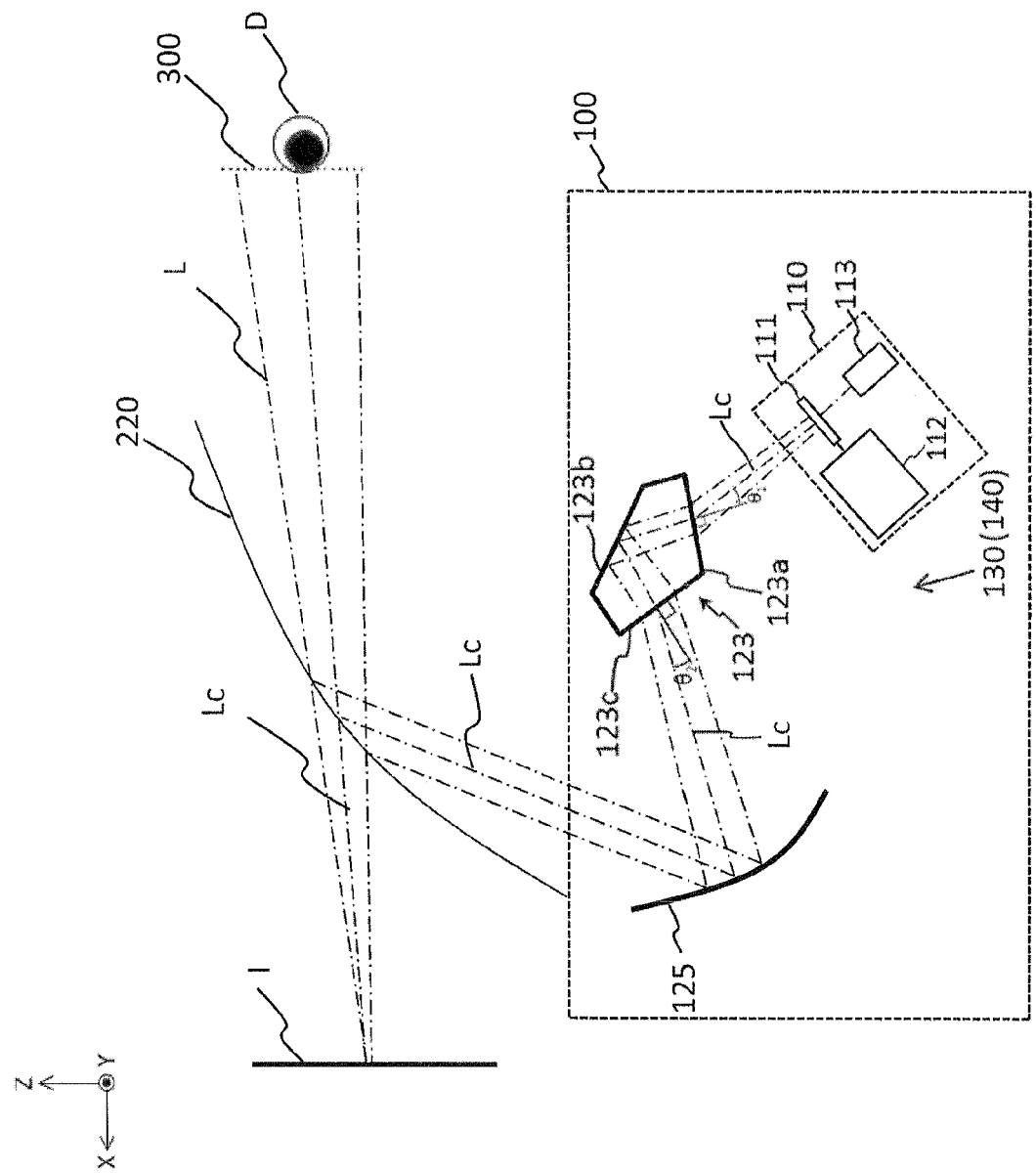
FIG. 6 is a diagram showing an operation of a head-up display according to a fourth embodiment.

FIG. 6 is a schematic diagram showing a configuration of the head-up display 100 according to the fourth embodiment. According to head-up display 100 of the present embodiment as shown in FIG. 6, the display device 110 includes the screen 111, the drive unit 112 that drives the screen 111, and the scanning laser 113 similarly to the second embodiment. Moreover, according to the head-up display 100 of the present embodiment, a relay optical system is not provided between the screen 111 of the display device 110 and the incident surface 123a of the free-form surface prism 123 similarly to the third embodiment.

According to the projection optical system 140 of the present embodiment, the first mirror 122, the incident surface 123a of the free-form surface prism 123 which is a prism element, the reflection surface 123b of the free-form surface prism 123, the emitting surface 123c of the free-form surface prism 123, and the second mirror 125 are sequentially disposed in the optical path from the display device 110.

The second mirror 125 has a free-form surface shape. This shape is adopted to correct distortion of a virtual image caused by reflection. In addition, each of the incident surface 123a, the reflection surface 123b, and the emitting surface 123c of the free-form surface prism 123 has a free-form surface shape. This shape is adopted to correct astigmatism caused by refraction on the incident surface 123a and the emitting surface 123c, and distortion of a virtual image caused on the reflection surface 123b.

While the prism element of the present embodiment adopts the free-form surface shape for all of the incident surface 123a, the reflection surface 123b, and the emitting surface 123c, a prism element which does not adopt the free-curved surface shape for these surfaces may be used. In addition, the free-form surface may be adopted for at least one of the incident surface 123a, the reflection surface 123b, and the emitting surface 123c.

As shown in FIG. 6, the incident surface 123a of the free-form surface prism 123 is inclined at an angle $|\theta_1|$ to the reference light Lc in the clockwise direction in an X-Z plan view of FIG. 6. Moreover, as shown in FIG. 6, the emitting surface 123c of the free-form surface prism 123 is inclined at an angle $|\theta_2|$ to the reference light Lc in the counterclockwise direction in the X-Z plan view of FIG. 6. This configuration can prevent stray light generated by external light entering the casing and reflected on the emitting surface 123c.

Aberration deteriorates as the incident surface 123a and the emitting surface 123c of the free-form surface prism 123 are further inclined to the reference light Lc. Sunlight is more directly viewed as the angle at which the incident surface 123a and the emitting surface 123c cross the reference light Lc becomes closer to the right angle. According to the present embodiment, therefore, upper limit and lower limit similar to those of the first embodiment are also defined for the incident surface 123a and the emitting surface 123c.

Moreover, aberration can be reduced when the angle $|\theta_1|$ of the incident surface 123a and the angle $|\theta_2|$ of the emitting surface 123c are equalized. According to the present embodiment, a relationship similar to the corresponding relationship of the first embodiment is established between the angle $|\theta_1|$ of the incident surface 123a and the angle $|\theta_2|$ of the emitting surface 123c to equalize the optical path length from the incident surface 123a to the reflection surface 123b with the optical path length from the reflection surface 123b to the emitting surface 123c while reducing aberration.

It is preferable that both the incident surface 123a and the emitting surface 123c are inclined to the reference light Lc. However, it is sufficient that at least either the incident surface 123a or the emitting surface 123c is inclined. This is because reduction of stray light is achievable even when only either the incident surface 123a or the emitting surface 123c is inclined.

A projection optical system of a head-up display includes an optical system further having two mirrors between the display device 110 and the second mirror 125 to form an intermediate image. According to the present embodiment, however, these two mirrors are combined by the free-form surface prism 123. In this case, light from the display device 110 is refracted using the incident surface 123a and the emitting surface 123c of the free-form surface prism 123 to produce a plurality of aberration correction effects using one element. In this manner, size reduction of the head-up display is achievable.

Moreover, the incident surface 123a and the emitting surface 123c of the free-form surface prism 123 are inclined clockwise and counterclockwise with respect to the reference light Lc, respectively. Accordingly, external light reflected on the incident surface 123a is reflected downward by the first mirror 122, while external light reflected on the emitting surface 123c is reflected downward by the second mirror 125. In this manner, entrance of external light into the viewpoint region 300 is avoidable.

[4-2. Effects and Others]

The head-up display 100 presented by way of example of the head-up display according to the fourth embodiment is a head-up display which allows the observer D to visually recognize the virtual image I including three-dimensional display. The head-up display 100 includes the display device 110 as an example of a display device, and the projection optical system 140. The projection optical system 140 includes the free-form surface prism 123 having the incident surface 123a, the reflection surface 123b, and the emitting surface 123c of the free-form surface prism 123 sequentially in the optical path from the display device 110. At least either the incident surface 123a or the emitting surface 123c is inclined to the reference light Lc. Accordingly, the free-form surface prism 123 reduces aberration, and also reduces stray light generated by reflection of external light on the screen 111 of the display device 110 and the like even when the external light enters the projection optical system 140. Moreover, according to the present embodiment, the free-form surface prism 123 in which two mirrors forming an intermediate image are integrated without providing these two mirrors has been used. This configuration therefore shortens the total length of the projection optical system 140, thereby achieving size reduction of the head-up display 100.

The head-up display 100 according to the fourth embodiment has the free-form surface prism 123 as a prism element, and therefore achieves preferable optical characteristics while reducing reflection of external light in an imaging optical system such as the head-up display 100.

Other Embodiments

The first to fourth embodiments have been described above by way of example of the technology disclosed in the present application. However, the technology of the present disclosure is not limited to these embodiments, and is also applicable to embodiments including changes, replacements, additions, omissions, and the like. In addition, new embodiments may be added by combining the respective components described in the first to fourth embodiments.

While the incident surface 123a and the emitting surface 123c of the free-form surface prism 123 are separate surfaces in the first to fourth embodiments, the incident surface 123a and the emitting surface 123c may be constituted by an identical surface.

The shapes of the reflection surfaces of the first mirror 122 and the second mirror 125 in the first to fourth embodiments are not limited to the free-form surface shapes. Each of the reflection surfaces of these mirrors may have a spherical shape, an aspherical shape, a toroidal shape, or an anamorphic shape, or the mirrors having these shapes may be disposed eccentrically with respect to the reference light Lc.

While the head-up display 100 is disposed below the dashboard 210 in the first to fourth embodiments, the head-up display 100 may be disposed above the dashboard 210.

Numerical Examples

Numerical examples corresponding to the first embodiment will be hereinafter presented with reference to FIGS. 7 to 14. Note that a length is indicated in units of millimeters (mm), and an angle is indicated in units of degrees in tables of the examples described hereinafter. In addition, the free-form surface is defined by the following mathematical formula.

$$z = \frac{cr^2}{1 + \sqrt{1 - (1+k)c^2r^2}} + \sum_{m,n} C_j x^m y^n \quad \text{[Formula 1]}$$

$(m \geq 0, n \geq 0, m+n > 0)$ $$j = \frac{(m+n)^2 + m + 3n}{2} + 1$$

In this formula, z is a sag amount at a position (x, y) from an axis defining a surface. Moreover, r is a radius of curvature at an origin of the axis defining the surface. Furthermore, c is a curvature at the origin of the axis defining the surface. In addition, k is a conic constant and corresponds to C1 of a polynomial coefficient. Furthermore, Cj is a coefficient of a monomial expression x<m>y<n>. Note that each of m and n is 0 or a larger integer.

In addition, according to the respective examples, the coordinate origin corresponding to a reference is a center of a display image (display surface) displayed on the display device 110. In the tables, the horizontal direction of the display surface corresponds to an X axis, the vertical direction corresponds to a Y axis, and the direction perpendicular to the display surface corresponds to a Z axis.

In addition, ADE in eccentricity data refers to an amount of rotation around the X axis from the Z axis direction to the Y axis direction. Moreover, BDE refers to an amount of rotation around the Y axis from the X axis direction to the Z axis direction. Furthermore, CDE refers to an amount of rotation around the Z axis from the X axis direction to the Y axis direction.

First Numerical Example

FIGS. 7 to 12 each show data associated with the optical system of the head-up display 100 of a first numerical example (first embodiment). The first numerical example adopts the configuration of the first embodiment. Specific data associated with the optical system is shown in FIGS. 7 to 12. FIG. 7 shows eccentricity data associated with each surface of each optical element of the head-up display 100. FIG. 8 shows a radius of curvature of each surface. FIGS. 9 to 12 each show polynomial coefficients representing a shape of a free-form surface.

FIG. 13 shows data associated with a size of the virtual image I and a distance from the observer D to the virtual image I in the first example. FIG. 14 shows corresponding values of the conditional expression (Formula 1) of the first embodiment.

The embodiments have been described by way of example of the technology of the present disclosure. The accompanying drawings and detailed description have been presented for this purpose. Accordingly, some of the constituent elements described in the accompanying drawings and the detailed description may include not only essential constituent elements for solving the problem, but also constituent elements which are not essential for solving the problem in order to illustrate the above technology. Therefore, it should not be immediately recognized that these non-essential components are imperative based on the fact that the non-essential components are described in the accompanying drawings and detailed description.

Note that examples of the mobile body equipped with the head-up display of the present disclosure include not only vehicles such as automobiles, but also motorcycles, trains, buses, airplanes, and the like each having a windshield. These mobile bodies may be equipped with the head-up display 100 of the present disclosure.

Furthermore, various changes, substitutions, additions, omissions, and the like within the scope of the appended claims or an equivalent thereof may be made for the embodiments described above by way of example of the technology of the present disclosure.

Summary of Embodiments (1) A head-up display of the present disclosure is a head-up display that projects a display image on a transparent reflecting member to present a visually recognizable virtual image. The head-up display includes: a display device that displays the display image; and a projection optical system that projects the display image displayed on the display device as a virtual image for an observer. On an assumption that light reaching a center of a viewpoint region of the observer and corresponding to a center of the virtual image is reference light, the projection optical system includes a prism element that has an incident surface, a reflection surface, and an emitting surface different from the incident surface sequentially in an optical path from the display device. The emitting surface is inclined to the reference light. An inclination amount $\theta_2$ of the reference light emitted from the emitting surface with respect to the emitting surface lies in a range of $15° < |\theta_2| < 45°$ in the optical path from the display device.

As described above, the projection optical system includes the prism element having the incident surface, the reflection surface, and the emitting surface sequentially disposed in the optical path from the display device. At least either the incident surface or the emitting surface is inclined. Therefore, stray light generated by reflection of external light on the incident surface or the reflection surface can be reduced even when the external light enters the projection optical system. In addition, the projection optical system includes the prism element having the incident surface and the reflection surface each producing a refraction effect and sequentially disposed in the optical path from the display device. This configuration can shorten the total length of the relay optical system, thereby achieving size reduction of the head-up display. Also, this configuration produces preferable optical characteristics while reducing reflection of external light in an imaging optical system such as the head-up display.

(2) In the head-up display of (1), the incident surface of the prism element is inclined to the reference light. An inclination amount $\theta_1$ of the reference light entering the incident surface with respect to the incident surface lies in a range of $15° < |\theta_1| < 45°$ in the optical path from the display device. This configuration therefore produces preferable optical characteristics while reducing reflection of external light in an imaging optical system such as the head-up display.

(3) in the head-up display of (1) or (2), a relationship between an inclination amount $\theta_1$ of the reference light entering the incident surface with respect to the incident surface, and an inclination amount $\theta_2$ of the reference light emitted from the emitting surface with respect to the emitting surface in the optical path from the display device is expressed as $0.7<|\theta_1/\theta_2|<1.3$. This configuration adjusts an optical path length of light passing through the incident surface or the emitting surface while reducing aberration even when the incident surface or the emitting surface is inclined to the reference light.

(4) In the head-up display of any one of (1) to (3), on an assumption that clockwise rotation with respect to the reference light is positive, a relationship between an inclination amount $\theta_1$ of the reference light entering the incident surface with respect to the incident surface, and an inclination amount $\theta_2$ of the reference light emitted from the emitting surface with respect to the emitting surface in the optical path from the display device is expressed as $\theta_1 \times \theta_2 < 0$. This configuration adjusts an optical path length of light passing through the incident surface or the emitting surface while reducing aberration even when the incident surface or the emitting surface is inclined to the reference light.

(5) In the head-up display of any one of (1) to (4), at least any one of the incident surface, the emitting surface, and the reflection surface of the prism element has a free-form surface shape. This configuration therefore produces preferable optical characteristics while reducing aberration in an imaging optical system such as the head-up display.

(6) In the head-up display of any one of (1) to (5), the display device is an optical member that has a diffusion characteristic for displaying the display image. This configuration therefore simplifies a configuration of the projection optical system, thereby achieving size reduction of the head-up display.

(7) The head-up display of any one of (1) to (6) further includes a first mirror having a light condensing function and disposed between the display device and the projection optical system.

(8) The head-up display of any one of (1) to (7) further includes a second mirror that corrects distortion of an image emitted from the emitting surface.

(9) in the head-up display of (7), the first mirror has a free-form surface shape.

(10) In the head-up display of (8), the second mirror has a free-form surface shape.

(11) A mobile body of the present disclosure is equipped with the head-up display of any one of (1) to (10). This configuration therefore provides a mobile body capable of reducing stray light generated by reflection of external light on the incident surface or the reflection surface of the projection optical system of the head-up display. In addition, the projection optical system of the head-up display includes the prism element having the incident surface and the reflection surface each producing a refraction effect and sequentially disposed in the optical path from the display device. Accordingly, this configuration provides a mobile body equipped with a head-up display which achieves size reduction by shortening the total length of the relay optical system.

(12) A projection optical system is a projection system that projects a display image displayed on the display device as an image. On an assumption that light corresponding to a center of the image is reference light, the projection optical system includes: a prism element that has an incident surface, a reflection surface, and an emitting surface different from the incident surface sequentially in an optical path from the display device. The emitting surface is inclined to the reference light. An inclination amount $\theta_2$ of the reference light emitted from the emitting surface with respect to the emitting surface lies in a range of $15°<|\theta_2|<45°$ in the optical path from the display device.

(13) In the projection optical system of (12), the incident surface of the prism element is inclined to the reference light. An inclination amount $\theta1$ of the reference light entering the incident surface with respect to the incident surface lies in a range of $15°<|\theta1|<45°$ in the optical path from the display device.

(14) In the projection optical system of (12) or (13), a relationship between an inclination amount $\theta_1$ of the reference light entering the incident surface with respect to the incident surface, and an inclination amount $\theta_2$ of the reference light emitted from the emitting surface with respect to the emitting surface in the optical path from the display device is expressed as $0.7<|\theta_1/\theta_2|<1.3$.

(15) in the projection optical system of any one of (12) to (14), on an assumption that clockwise rotation with respect to the reference light is positive, a relationship between an inclination amount $\theta_1$ of the reference light entering the incident surface with respect to the incident surface, and an inclination amount $\theta_2$ of the reference light emitted from the emitting surface with respect to the emitting surface in the optical path from the display device is expressed as $\theta_1 \times \theta_2 < 0$.

(16) In the projection optical system of any one of (12) to (15), at least any one of the incident surface, the emitting surface, and the reflection surface of the prism element has a free-form surface shape.

(17) The projection optical system of any one of (12) to (16) further includes a first mirror having a light condensing function and disposed between the display device and the projection optical system.

(18) The projection optical system of any one of (12) to (17) further includes a second mirror that corrects distortion of an image emitted from the emitting surface.

(19) A projection optical system is a projection optical system that projects a display image displayed on the display device as an image. On an assumption that light corresponding to a center of the image is reference light, the projection optical system includes: a prism element that has an incident surface, a reflection surface, and an emitting surface different from the incident surface sequentially in an optical path from the display device, the emitting surface being inclined to the reference light; and a second mirror that corrects distortion of an image emitted from the emitting surface.

(20) The projection optical system of (19) includes a first mirror having a light condensing function and disposed between the display device and the projection optical system.

INDUSTRIAL APPLICABILITY

The present disclosure is applicable to a head-up display that uses a refractive optical system such as a prism element. Specifically, the present disclosure is applicable to head-up displays for vehicles and the like. In addition, the present disclosure is applicable to not only vehicles such as automobiles, but also motorcycles, trains, buses, airplanes, and the like each having a windshield.

The invention claimed is:

1. A head-up display that projects a display image on a transparent reflecting member to present a visually recognizable virtual image, the head-up display comprising:
   a display device that displays the display image; and
   a projection optical system that projects the display image displayed on the display device as a virtual image for an observer, wherein
   on an assumption that light reaching a center of a viewpoint region of the observer and corresponding to a center of the virtual image is reference light, the projection optical system includes a prism element that has an incident surface, a reflection surface, and an emitting surface different from the incident surface sequentially in an optical path from the display device, the emitting surface being inclined to the reference light,
   wherein an inclination amount $\theta 2$ of the reference light emitted from the emitting surface with respect to the emitting surface lies in a range of $15°<|\theta 2|<45°$ in the optical path from the display device,
   wherein the incident surface of the prism element is inclined to the reference light,
   wherein an inclination amount $\theta 1$ of the reference light entering the incident surface with respect to the incident surface lies in a range of $15°<|\theta 1|<45°$ in the optical path from the display device.

2. The head-up display according to claim 1, wherein, on an assumption that clockwise rotation with respect to the reference light is positive, a relationship between an inclination amount $\theta 1$ of the reference light entering the incident surface with respect to the incident surface, and an inclination amount $\theta 2$ of the reference light emitted from the emitting surface with respect to the emitting surface in the optical path from the display device is expressed as $\theta 1 \times \theta 2 < 0$.

3. The head-up display according to claim 1, wherein at least any one of the incident surface, the emitting surface, and the reflection surface of the prism element has a free-form surface shape.

4. The head-up display according to claim 1, wherein the display device is an optical member that has a diffusion characteristic for displaying the display image.

5. The head-up display according to claim 1, further comprising a first mirror having a light condensing function and disposed between the display device and the projection optical system.

6. The head-up display according to claim 5, wherein the first mirror has a free-form surface shape.

7. The head-up display according to claim 1, further comprising a second mirror that corrects distortion of an image emitted from the emitting surface.

8. The head-up display according to claim 7, wherein the second mirror has a free-form surface shape.

9. A mobile body equipped with the head-up display according to claim 1.

10. A head-up display that projects a display image on a transparent reflecting member to present a visually recognizable virtual image, the head-up display comprising:
    a display device that displays the display image; and
    a projection optical system that projects the display image displayed on the display device as a virtual image for an observer, wherein
    on an assumption that light reaching a center of a viewpoint region of the observer and corresponding to a center of the virtual image is reference light, the projection optical system includes a prism element that has an incident surface, a reflection surface, and an emitting surface different from the incident surface sequentially in an optical path from the display device, the emitting surface being inclined to the reference light,
    wherein an inclination amount $\theta 2$ of the reference light emitted from the emitting surface with respect to the emitting surface lies in a range of $15°<|\theta 2|<45°$ in the optical path from the display device
    wherein a relationship between an inclination amount $\theta 1$ of the reference light entering the incident surface with respect to the incident surface, and an inclination amount $\theta 2$ of the reference light emitted from the emitting surface with respect to the emitting surface in the optical path from the display device is expressed as $0.7<|\theta 1/\theta 2|<1.3$.

11. A projection optical system that projects a display image displayed on a display device as an image,
    on an assumption that light corresponding to a center of the image is reference light, the projection optical system comprising:
    a prism element that has an incident surface, a reflection surface, and an emitting surface different from the incident surface sequentially in an optical path from the display device, the emitting surface being inclined to the reference light,
    wherein an inclination amount $\theta 2$ of the reference light emitted from the emitting surface with respect to the emitting surface lies in a range of $15°<|\theta 2|<45°$ in the optical path from the display device,
    wherein the incident surface of the prism element is inclined to the reference light,
    wherein an inclination amount $\theta 1$ of the reference light entering the incident surface with respect to the incident surface lies in a range of $15°<|\theta 1|<45°$ in the optical path from the display device.

12. The projection optical system according to claim 11, wherein, on an assumption that clockwise rotation with respect to the reference light is positive, a relationship between an inclination amount $\theta 1$ of the reference light entering the incident surface with respect to the incident surface, and an inclination amount $\theta 2$ of the reference light emitted from the emitting surface with respect to the emitting surface in the optical path from the display device is expressed as $\theta 1 \times \theta 2 < 0$.

13. The projection optical system according to claim 11, wherein at least any one of the incident surface, the emitting surface, and the reflection surface of the prism element has a free-form surface shape.

14. The projection optical system according to claim 11, further comprising a first mirror having a light condensing function and disposed between the display device and the projection optical system.

15. The projection optical system according to claim 11, further comprising a second mirror that corrects distortion of an image emitted from the emitting surface.

16. A projection optical system that projects a display image displayed on a display device as an image,
    on an assumption that light corresponding to a center of the image is reference light, the projection optical system comprising:
    a prism element that has an incident surface, a reflection surface, and an emitting surface different from the incident surface sequentially in an optical path from the display device, the emitting surface being inclined to the reference light, wherein an inclination amount $\theta 2$ of the reference light emitted from the emitting surface with respect to the emitting surface lies in a range of $15°<|\theta 2|<45°$ in the optical path from the display device, wherein a relationship between an inclination amount $\theta 1$ of the reference light entering the incident surface with respect to the incident surface, and an inclination amount $\theta 2$ of the reference light emitted from the emitting surface with respect to the emitting surface in the optical path from the display device is expressed as $0.7<|\theta 1/\theta 2|<1.3$.

* * * * *